United States Patent
Teo et al.

(10) Patent No.: US 6,873,488 B2
(45) Date of Patent: Mar. 29, 2005

(54) ENHANCED MR OFFSET WITH DYNAMIC TUNING RANGE

(75) Inventors: SongWee Teo, Singapore (SG); WeiMing Yeow, Singpore (SG); QuckLeong Choo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 125 days.

(21) Appl. No.: 10/459,996

(22) Filed: Jun. 12, 2003

(65) Prior Publication Data

US 2004/0080859 A1 Apr. 29, 2004

Related U.S. Application Data

(60) Provisional application No. 60/420,950, filed on Oct. 24, 2002.

(51) Int. Cl.$^7$ ............................ G11B 5/596; G11B 27/36
(52) U.S. Cl. ......................... 360/77.06; 360/31; 360/76
(58) Field of Search .............................. 360/31, 75, 53, 360/77.02, 77.06, 76; 324/210, 212

(56) References Cited

U.S. PATENT DOCUMENTS

| | | |
|---|---|---|
| 4,513,331 A | 4/1985 | Baker |
| 4,912,576 A | 3/1990 | Janz |
| 5,691,857 A | 11/1997 | Fitzpatrick |
| 5,793,555 A | 8/1998 | Belser |
| 5,867,343 A | 2/1999 | Le |
| 5,909,333 A | 6/1999 | Best |
| 5,986,847 A | 11/1999 | Le |
| 5,991,115 A | 11/1999 | Chainer |
| 6,008,962 A | 12/1999 | Le |
| 6,061,201 A * | 5/2000 | Woods ..................... 360/77.06 |
| 6,067,205 A * | 5/2000 | Mathews et al. ........ 360/77.04 |
| 6,320,718 B1 | 11/2001 | Bouwkamp |
| 6,519,107 B1 | 2/2003 | Ehrlich |
| 6,650,491 B2 * | 11/2003 | Suzuki et al. ................. 360/31 |

* cited by examiner

*Primary Examiner*—Andrew L. Sniezek
(74) *Attorney, Agent, or Firm*—Kirk A. Cesari

(57) ABSTRACT

A reader-to-writer offset for a head positioned over a track on a disc in a disc drive having a plurality of tracks is generated by using two iterations. A first iteration is used to determine a fine-tuning range that is used for a second iteration. The first iteration uses coarse steps of the reader across the track pitch to roughly determine OTC boundaries (which are used as the fine-tuning range). The fine-tuning range is determined by locating the point before the first valid reading (e.g., a VGA reading or BER reading with a rate that is less than the BER threshold) and by locating the point after the last valid reading. The second iteration uses fine steps of the reader across the track pitch to determine the actual OTC boundaries. The OTC boundaries are the first valid reading and the last valid reading that are made using the fine steps.

20 Claims, 9 Drawing Sheets

ENHANCED MR OFFSET WITH DYNAMIC TUNING RANGE

RELATED APPLICATIONS

This application claims the benefit of priority of U.S. provisional application Ser. No. 60/420,950 filed on Oct. 24, 2002 and titled "ENHANCED MR OFFSET WITH DYNAMIC TUNING RANGE."

FIELD OF THE INVENTION

This invention relates generally to head offset calibration in a disc drive, and, in particular, to dynamically tuning the reader-to-writer offset of a head to reduce track misregistration (TMR).

BACKGROUND OF THE INVENTION

Disc drives are data storage devices that store digital data in magnetic form on a rotating storage medium called a disc. Modern disc drives comprise one or more rigid discs that are coated with a magnetizable medium and mounted on the hub of a spindle motor for rotation at a constant high speed. Each surface of a disc is divided into several thousand tracks that are tightly-packed concentric circles similar in layout to the annual growth rings of a tree. The tracks are typically numbered starting from zero at the track located outermost the disc and increasing for tracks located closer to the center of the disc. Each track is further broken down into data sectors and servo bursts. A data sector is normally the smallest individually addressable unit of information stored in a disc drive and typically holds 512 bytes of information plus additional bytes for internal drive control and error detection and correction. This organization of data allows for easy access to any part of the discs. A servo burst is a particular magnetic signature on a track, which facilitates positioning of heads over tracks.

Generally, each of the multiple discs in a disc drive has associated with it two heads (one adjacent the top surface of the disc and another adjacent the bottom) for writing and reading data to or from a sector. Each head is mounted at the distal end of an actuator arm that extends toward the disc and pivots about the bearing shaft assembly connected to a voice coil motor in the disc drive. A read element (or a reader) and a write element (or a writer) are mounted on each head. A gap separates the reader and writer along the longitudinal axis of the actuator arm. The head skew angle, which is the angle between a tangential line to a track and the line drawn along the longitudinal axis of the actuator arm, changes as the head moves from the inner diameter to the outer diameter of the disc, and vice versa. The combination of the gap and the varying head skew angle causes the radial distance between the path of the reader on the disc and the path of the writer on the disc to be variable as the head moves from the inner diameter to the outer diameter of the disc, and vice versa. This varying radial distance between the reader and the writer is known as the reader-to-writer offset.

In general, the data storage format of a track is comprised of an alternating sequence of address headers (including servo fields) and data fields on a track. The address headers store address information, which identifies the respective addresses of the data fields. The data fields store user data. Two methods are typically used to write the address headers and data fields. The first method is to write the alternating address headers and data fields as close to the center of the track as possible. The second method is to write them in alternating sequence but to write the data fields at an offset from the servo fields in order to take into account the presence of the reader-to-writer offset. The basic difference between the first method and the second method is that the first method requires a micro minijog of the actuator arm during a write operation whereas the second method requires a micro minijog of the actuator arm during a read operation. For example according to the first method, during a write operation, the reader first reads the address headers and compares them to the target address. If the address read from an address header matches the target address, the writer writes the data in the data field. However, as soon as a target data field has been identified, the actuator arm must perform a minijog to position the writer over the data field so that the writer can write data in the target data field. The reader-to-writer offset is the distance the actuator arm must displace in order to position the writer over the target data field. This micro minijog of the actuator arm to position the writer over the data fields is not required according to the second method since the data fields are already prewritten at an offset, which is substantially equivalent to the reader-to-writer offset. However, just the opposite during a read operation, the actuator arm is required to perform a micro minijog to place the reader over the data field.

This reader-to-writer offset measurement is crucial since it will impact the disc drive performance against the track misregistration (TMR). TMR generally refers to position errors of the head between the target head position and the actual head position influenced by external disturbances such as disc flutter, runouts, disc vibrations, etc. The reader can read good data (i.e., data that contains no bit error or recoverable bit errors) only on small a portion of the track pitch (or width) of the track, and this portion of the track pitch is generally referred to as the off-track capability (OTC) of the head. For example, the OTC of a disc drive may only be about 10% of the track pitch. Thus, the reader or the writer must be positioned within the OTC (i.e., within the 10% of the track pitch) in order to successfully read information from or write data to the track.

If the reader-to-writer offset measurement contains an error, one outcome is that the target head position may not be within the OTC of the head. The other outcome is that the target head position may not be located at the center of the OTC although it may be within the OTC of the head. In such a case, the target head position would still allow the reader to successfully read good data written on the track but would not provide optimal protection against the TMR. This is because the target head position would be located closer to one of the two edges of the OTC, and there exists higher probability that the external disturbance might displace the head outside the OTC of the head.

The main technique that is currently used to determine the reader-to-writer offset is known as the bit-error-rate (BER) technique; however, this technique does not require that the target head position be located at the center of the OTC of the head. Accordingly, there is a need for determining an optimal reader-to-writer offset value that allows the target head position to be located at the center of the OTC of the head and provides better protection against TMR.

SUMMARY OF THE INVENTION

Against this backdrop, the present invention has been developed. The present invention essentially is a method of and an apparatus for generating an optimal reader-to-writer offset for a head positioned over a track on a disc in a disc drive having a plurality of tracks. A reader and a writer are mounted on the head in a non-overlapping manner with a gap between the reader and the writer, which is known as the reader-to-writer offset.

A disc drive controller is operably connected to the reader and the writer. The disc drive controller determines the reader-to-writer offset of the head for each track by computing the difference between a first head position x1 and a second head position x2. The first head position x1 is an optimal head position for writing information on the track and the second head position x2 is a midpoint or a center of an off-track capability (OTC) of the head for a given track. The OTC is a portion of a track pitch over which the reader is expected to read information that is free of an incorrigible bit error such that the writer-to-reader track misregistration (TMR) is minimized as the head is radially displaced the reader-to-writer offset to read information written on the track or to write information on the track.

The head is optimally positioned for writing information on the track when the center of the writer is positioned over the center of the track pitch. Further, the information written on the track is deemed to be free of an incorrigible bit error if a successful variable gain amplifier (VGA) value can be obtained after reading the information over a plurality of disc revolutions. Alternatively, the information written on the track is deemed to be free of an incorrigible bit error if the bit-error-rate (BER) is less than a predetermined threshold BER value.

Two iterations are used to determine the OTC for the reader. A first iteration is used to determine a fine-tuning range that is used for a second iteration. The first iteration uses coarse steps of the reader across the track pitch to roughly determine OTC boundaries (which are used as the fine-tuning range). The fine-tuning range is determined by locating the point before the first valid reading (e.g., a VGA reading or a BER reading with a rate that is less than the BER threshold) and by locating the point after the last valid reading. The second iteration uses fine steps of the reader across the track pitch to determine the actual OTC boundaries. The OTC boundaries are the first valid reading and the last valid reading that are made using the fine steps.

The second head position x2 is determined by measuring a first head position parameter P1 and a second head position parameter P2 and computing the midpoint between the first head position parameter P1 and the second head position parameter P2. The first head position parameter P1 and the second head position parameter P2 are the two end points of the OTC of the head. The first head position parameter P1 is the first head position nearest the first edge of the track pitch for which a successful reading has been obtained. The second head position parameter P2 is the second head position nearest the second edge of the track pitch for which a successful reading has been obtained. The midpoint defined by the first had position P1 and the second head position P2 is then stored in the memory.

These and various other features as well as advantages that characterize the present invention will be apparent from a reading of the following detailed description and a review of the associated drawings.

DETAILED DESCRIPTION

Figure 1:
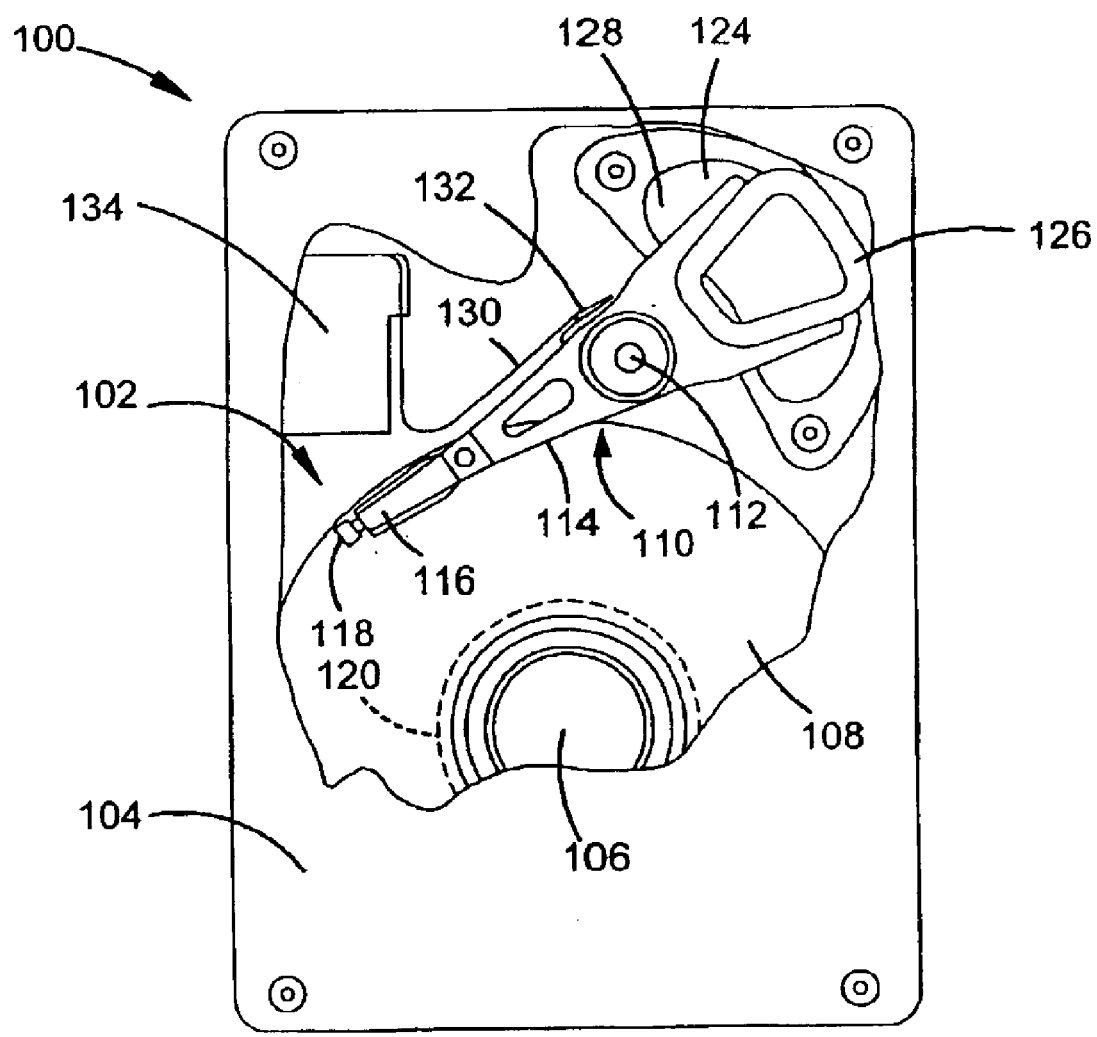
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
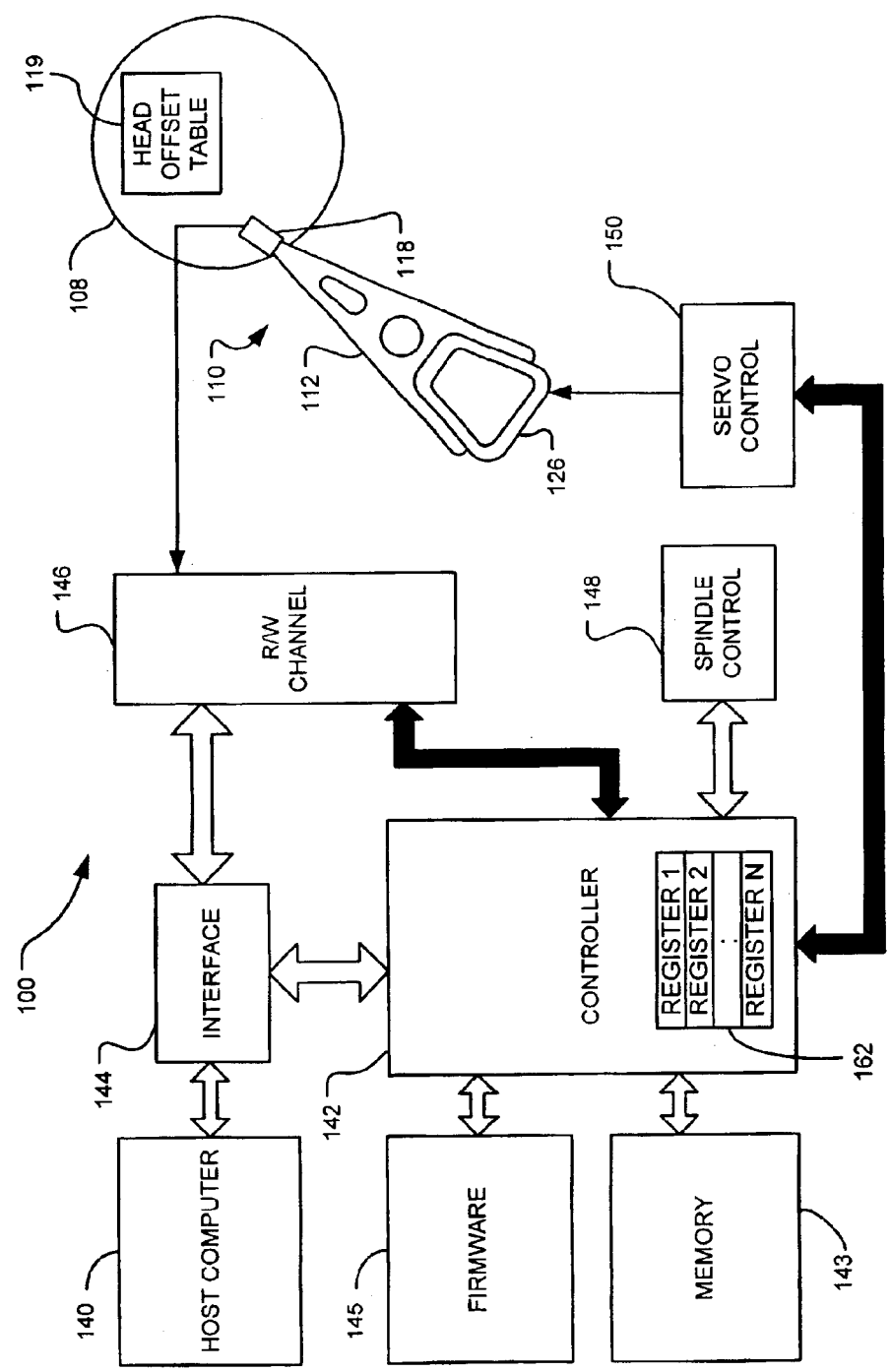
FIG. 2 is a simplified block diagram of a disc drive and its connection to the host computer system including a servo system with which the present invention is particularly useful.

Referring now to FIG. 2, shown therein is a functional block diagram of the disc drive 100 of FIG. 1, generally showing the main functional circuits that are resident on the disc drive printed circuit board and used to control the operation of the disc drive 100. A controller 142 generally provides top-level communication between the disc drive 100 and a host computer 140 that is operably connected to the disc drive 100 and also provides control of the disc drive 100 with the ability to execute programs stored in a memory 143 and/or a firmware 145. A set of registers 162 is included in the controller 142. The register 162 is one of a small set of data holding places that are part of the controller and that provides a place for passing data from one instruction to the next sequential instruction or to another program that the controller 142 has given control to.

The memory 143 may be a random access memory (RAM), a read only memory (ROM), or other sources of resident memory for the controller 142. The memory 143 may include spaces for general data store and/or store of programming modules. Each programming module stores computer readable instructions that are typically executable by the controller 142. The programming modules may be stored in the firmware 145 rather than in the memory 143. A set of programming instructions may be stored in the firmware 145 by the host computer 140 via a disc drive interface 144. Generally, the programming instructions in the firmware 145 can be distributed like other software modules and can be created and tested by utilizing microcode simulation. The firmware 145 is often a key component of the disc drive operation, because it contains generally the software program for disc drive operations that could operate independently from the control of the host computer 140.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation, the controller 142 receives information regarding the velocity and acceleration of the head 118 and uses that information in conjunction with a model, stored in the memory 143, to communicate with the servo control circuit 150, which will apply a controlled amount of current to the voice coil motor 126, thereby causing the actuator assembly 110 to be pivoted.

Data is transferred between the host computer 140 and the disc drive 100 by way of the disc drive interface 144, which typically includes a buffer to facilitate high speed data transfer between the host computer 140 and the disc drive 100. Data to be written to the disc drive 100 are thus passed from the host computer to the disc drive interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Generally, the disc drive interface 144 includes hardware and/or software that regulates transmission of data and manages the exchange of data between the disc drive 100 and the host computer 140. This disc drive interface 144 is contained in the electronics of the disc drive 100. A standard committee such as American National Standard Institute (ANSI) oversees the adoption of an interface protocol by which any peripheral device following the common standard can be used interchangeably. Programming of the firmware 145 follows the disc drive interface protocol.

There are various types of disc drive interface standards such as Small Computer Systems Interface (SCSI), FibreChannel-Arbitrated Loop (FC-AL), Serial Storage Architecture (SSA), Advanced Technology Attachment (ATA), Integrated Device Electronics (IDE), CompactFlash, etc. In an embodiment of the present invention, the ATA interface standard is used as an interface between the host computer 140 and the disc drive 100. However, it is well known to those skilled in the art that the same scope and spirit disclosed in an embodiment of the present invention can also be applied to other types of disc drive interfaces listed above.

Figure 3:
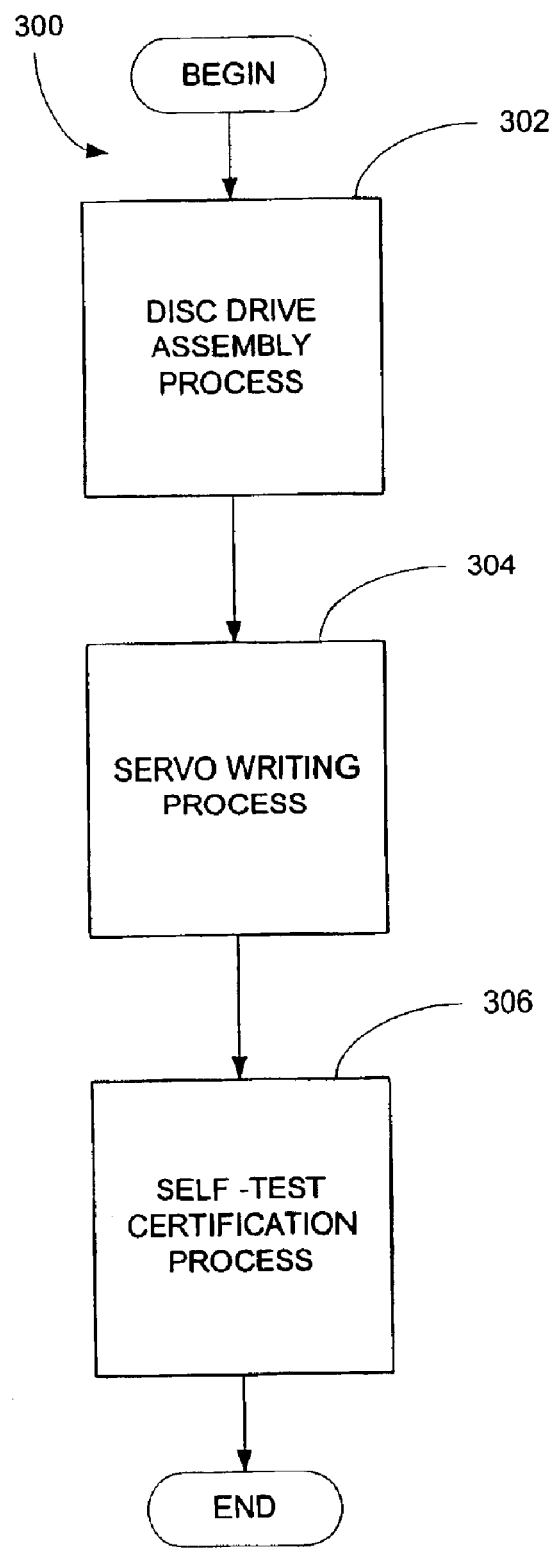
FIG. 3 is a simplified flowchart of a disc drive manufacturing process in accordance with an embodiment of the present invention.

A typical disc drive 100 is basically manufactured by a process shown in FIG. 3. The disc drive components are first assembled in the manufacturing process in operation 302. Then the servo information that defines tracks is written on the discs 108 in the disc drive 100 in a servowriter in operation 304. Thereafter, the disc drive controller conducts a self-test certification process in operation 306 to determine whether or not the disc drive 100 is a good or bad drive and to record operational parameters on the disc 108 if the disc drive 100 is determined to be a good drive. For example, the entire data storage area of each disc 108 may be scanned in the self-test certification process 306 to detect micro defects in sectors. If the total number of identified micro defects is more than the predetermined threshold, the disc drive 100 may be determined as a bad drive in process 306. Alternatively, if the total number of identified defects is less than the predetermined threshold, the disc drive 100 may be determined as a good drive. All of the identified defective sector addresses are then stored in a set of sectors on the reference tracks that are not accessed by a user during normal operations. During each subsequent power-up of the disc drive, the operational parameters stored on the reference tracks of the disc are recalled to the memory 143 for use during normal disc drive operations.

Figure 4:
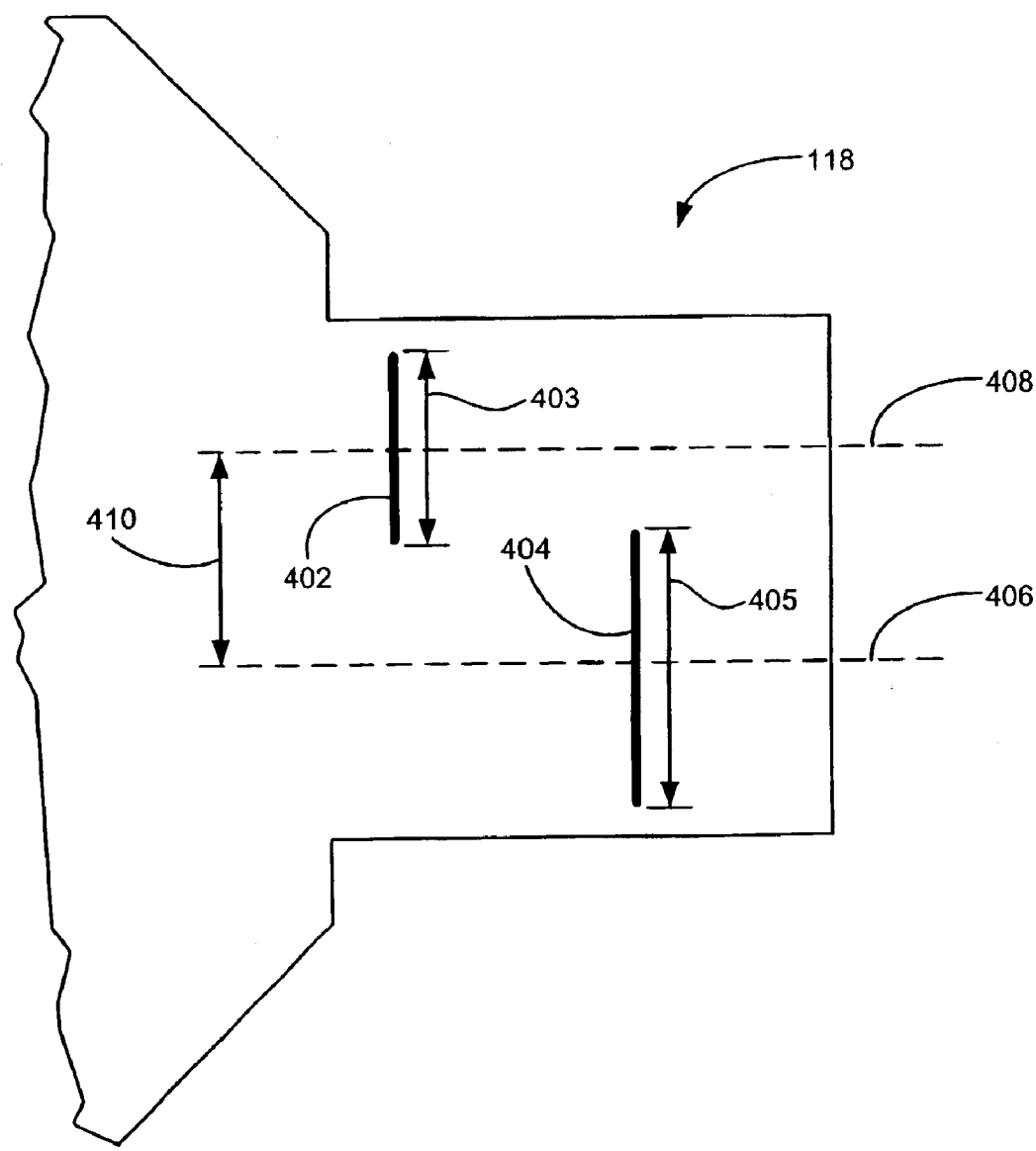
FIG. 4 is a generalized diagrammatic illustration of a portion of the head mounted at the distal end of the actuator arm in a disc drive in accordance with an embodiment of the present invention.
Figure 6:
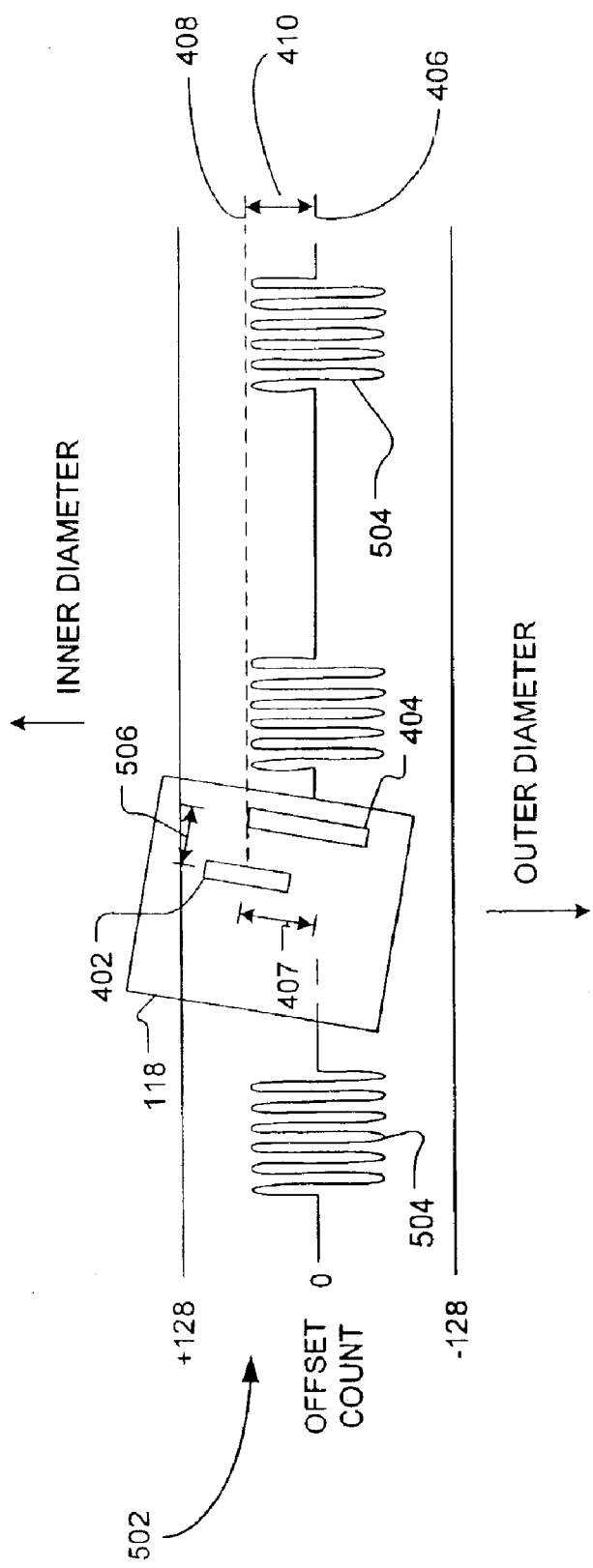
FIG. 6 is an enlarged view of the reader and the writer mounted on the head positioned over a track that is recorded with a signal such as grey code, servo burst pattern, general data, etc.

A head offset table 119 (FIG. 2) is one such area for storing operational parameters on the reference track for storing one type of disc drive operational parameter known as a reader-to-writer offset 410 (FIGS. 4 and 6). The head offset table 119 stores the reader-to-writer offset values for the head 118 for each track. Typically, the reader-to-writer offset 410 is measured on the first track of each zone. There are typically thirteen zones on the disc 108, but the number of zones on the disc is a matter of design choice. Typically, the reader-to-writer offset values corresponding to only the first tracks in the zones are stored in the head offset table 119. During the power-up of the disc drive 100, these reader-to-writer offset values are transferred to the memory 143 for use during normal operations of the disc drive 100. The tracks that are in between the two first tracks of two consecutive zones are interpolated, as described in the following paragraphs.

The data area on the disc is typically divided into thirteen zones, although this number is variable depending on the design choice. During measurement process, the reader-to-writer offset 410 was measured on only the first track of each zone. For other tracks, the reader-to-writer offset values are interpolated. For example, a third-order polynomial may be used to interpolate the offset for each track in between the two first -tracks of two consecutive zones. For example, suppose there are 1000 tracks in each zone. Then, the optimal reader-to-writer offset 410 values are measured for tracks 0, 1000, 2000, 3000, 4000 . . . 13000, and a series of equations can be generated from these 13 points:

Offset(0)=$a3*(0)^3+a2*(0)^2+a1*(0)+a0$, for track number 0;

Offset(1000)=$a3*(1000)^3+a2*(1000)^2+a1*(1000)+a0$, for track number 1000;

Offset(2000)=$a3*(2000)^3+a2*(2000)^2+a1*(2000)+a0$, for track number 2000;

Offset(3000)=$a3*(3000)^3+a2*(3000)^2+a1*(3000)+a0$, for track number 3000;

Offset(13000)=$a3*(13000)^3+a2*(13000)^2+a1*(13000)+a0$, for track number 1300;

Offset(13999)=$a3*(13999)^3+a2*(13999)^2+a1*(13999)+a0$, for track number 1399;

The coefficients [a3, a2, a1, a0] can be solved by using the least square method. Then the offset for any track can be accurately estimated based on the coefficients.

Figure 5:
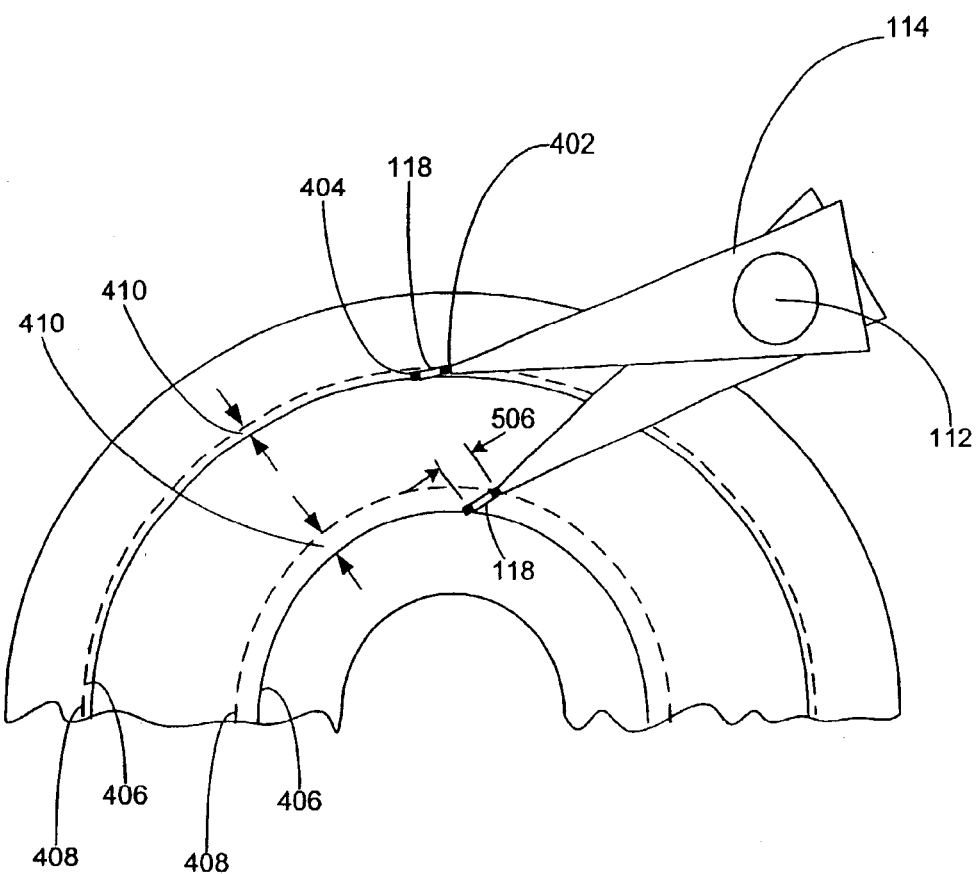
FIG. 5 shows a separate reader and a writer mounted on the head that is mounted at the distal end of the rotary actuator arm, which pivots about the bearing shaft assembly, to generally illustrate that the reader-to-writer offset varies as the actuator arm radially traverses over the disc.

The reader-to-writer offset 410 is described in more detail with reference to FIGS. 4–6. Note that the series of the elements shown in FIGS. 4–6 are grossly exaggerated (not drawn to scale) and drawn for an illustration purpose only. FIG. 4 is a generalized diagrammatic illustration of a portion of the head 118 mounted at the distal end of the actuator arm 114. The head 118 includes a read element (or a reader) 402 and a write element (or a writer) 404. The reader 402 has a width (referenced at 403) and is centered along its width about centerline 408. The writer 404 also has a width (referenced at 405) and is centered along its width about centerline 406. The gap measured between the two centerlines 406 and 408 when these two centerlines 406, 408 run in parallel with a line that is tangential to a track is known as the reader-to-writer offset 410. The gap (the reader-to-writer offset 410) is variable depending on the skew angle of the actuator arm 114, and this aspect of varying reader-to-writer offset 410 is further illustrated with respect to FIG. 5.

FIG. 5 shows a separate reader 402 and a writer 404 mounted on the head 118 that is mounted at the distal end of the rotary actuator arm 114, which pivots about the bearing shaft assembly 112. A gap 506 along the longitudinal axis of the actuator assembly arm 114 exists between the reader 402 and the writer 404. The head skew angle, which is the angle between a tangential line to a track and the line drawn along the longitudinal axis of the actuator arm 114, changes as the head 118 moves from the inner diameter to the outer diameter of the disc, and vice versa. The combination of the gap 506 and the varying head skew angle causes the radial distance defined by the reader-to-writer offset 410 between the path of the reader 408 (or the centerline 408) and the path of the writer 406 (or the centerline 406) to vary as the head 118 moves from the inner diameter to the outer diameter of the disc 108, and vice versa.

FIG. 6 is an enlarged view of the reader 402 and the writer 404 on the head 118 over a track 502 that is recorded with a signal 504 (e.g., grey code, servo burst pattern, general data, etc.). The writer 404 is centered at the offset count position of 0. In an embodiment of the invention, each track 502 is divided into 256 offset counts. The width of the track 502, (also known as the track pitch) may be less than the width of the potential MR offset ("MR offset range"), especially as successively newer drives have increasing numbers of tracks per inch. The MR offset range extends across six tracks and is divided into 128 points. Each point is equivalent to 12 counts of MR offset as defined by the relationship 6 tracks×(256 offset counts/track)/128 points=12 offset counts/point The MR offset range is defined by a range of offset counts that spans from +127 to −128, with the center of the track pitch being located at the offset count position 0. Although an offset count length of 1 is defined as $\frac{1}{256}$ of the track length in FIG. 6, the size of one offset count length is a matter of design choice, and the track pitch can be subdivided into even smaller units of offset count for finer positioning control of the head 118 over the track 502. The center of the signal at the offset count position of 0 aligns with the writer centerline 406. At this offset count position of 0, the signal 504 passes directly underneath the center of the writer 404. However, the center of the reader 402 (or the reader centerline 408) is not positioned over the center of the signal 504. The reader centerline 408 is positioned away from the center of the signal 504 (which coincides with the writer centerline 406) by the reader-to-writer offset 410. The reader 402 therefore has to be displaced by the reader-to-writer offset 410 in order to read the signal 504 written by the writer 404.

As previously discussed, the reader-to-writer offset 410 for a track varies from one track to another track since the head skew angle varies as the head 118 traverses from inner diameter to outer diameter of the disc, and vice versa. Thus, each track has a different reader-to-writer offset 410 value. The reader-to-writer offset 410 value for each track on the disc therefore has to be determined so that the controller 142 can position the reader 402 over the track for accurate reading of the signal on the track in a manner that produces the least amount of error.

The sync-mark error (SME) technique is one approach for determining the reader-to-writer offset 410. All data within the tuning range (MR offset range) for each zone is erased (because of the possibility of multiple tracks falling within the tuning range) and target data is written in the center of the track. The SME technique tunes each zone by making a series of read operations across an MR offset range for a representative track for a particular zone. The read operations are used to determine a variable gain amplifier (VGA) value that is used to bias the reader 402 for optimal reading of track information. An error is returned when a bias value cannot be reached (e.g., when the reader 402 is too far from an optimal read location). Determining the VGA variable across the entire MR offset range at each point is time consuming, especially where increasingly smaller track widths are used.

The bit-error-rate (BER) technique is another approach used for determining the reader-to-writer offset 410. BER is defined as the relationship between the number of bits read incorrectly by the reader 402 and the total number of bits read by the reader 402, and it is represented by the following equation:

BER=(the number of bits read in error)/(the total number of bits read)

BER is usually specified as a number times 10 raised to a negative exponent. Intuitively, the lowest BER would be measured at the center of the track 502 (i.e., the offset count position 0) since the data is theoretically targeted to be written at the track center. BER would increase as the reader 402 moves away from the offset count position 0 toward either the inner diameter or the outer diameter of the disc 108. The reader-to-writer offset 410 is determined by measuring a first head position (x1) when the center of the writer 404 is aligned with the center of the signal 504 on the track 502. Then, the reader 402 beginning at the offset count position +127 traverses across the track while monitoring BER moving toward the offset count position 0 and then toward the offset count position −128. The second head position (x2) is then recorded when BER is the lowest. Theoretically, the second head position (x2) is located at the track center (i.e., the offset count position 0), but this is not necessarily true in a typical disc drive. The reader-to-writer offset 410 is determined by taking the difference between x1 and x2 (i.e., |x1−x2|).

Two iterations of the tuning operations are used in accordance with the present invention to meet time constraints and accuracy requirements for tuning MR offset ranges. A first series of tuning operations uses more widely spaced ("coarse") measurements across the MR offset range to produce a rough measurement of the width and location of the portion of the track lying within the OTC of the head, while a second series of tuning operations uses more narrowly spaced ("fine") measurements to more closely determine the boundaries of the portion of the track lying within the OTC of the head. The measurements of the boundaries are used to replace default MR offsets for every zone that have been predefined and stored in the head offset table 119 with an empirically determined MR offset.

Figure 7A:
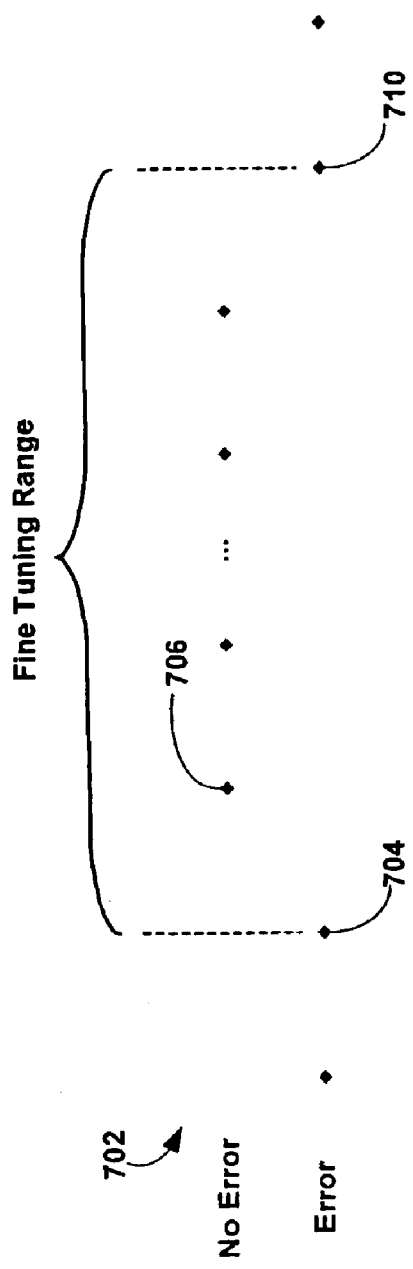
FIG. 7a shows a SME profile of a first iteration for measuring SME values (such as values 704 and 706) across the tuning range of a typical track in accordance with the present invention.

FIG. 7a shows a SME profile of a first iteration for measuring SME values (such as values 704 and 706) across the tuning range of a typical track in accordance with the present invention. The first iteration uses a 12-step count for measuring the MR offset, which divides the tuning range into 128 points. The default MR offset value is typically assigned to the center of the tuning range (as shown at offset count position zero). Accordingly, the tuning range extends 63 points above the center of the tuning range, and also extends 64 points below the center of the tuning range. (Each point represents a 12-step count for the MR offset, as discussed above.)

The first iteration performs a VGA reading at each point across the tuning range using a first sync-mark tolerance. The first iteration may determine values from points −64 to +63 sequentially, although other permutations, numbers of points, and count step sizes can be used. VGA readings made at points that lie outside of the OTC of the head typically cause a sync-mark error. (For example, SME value 704 represents a point at which a sync-mark error was caused, and example value 706 represents a point at which an error was not encountered.) The last (e.g., value 704) and the first (e.g., value 710) SME values that reflect a sync-mark error are used to define the tuning range for the second iteration. Value 706 is the first SME value that does not reflect an error and value 708 is the last SME value that does not reflect an error.

Figure 7B:
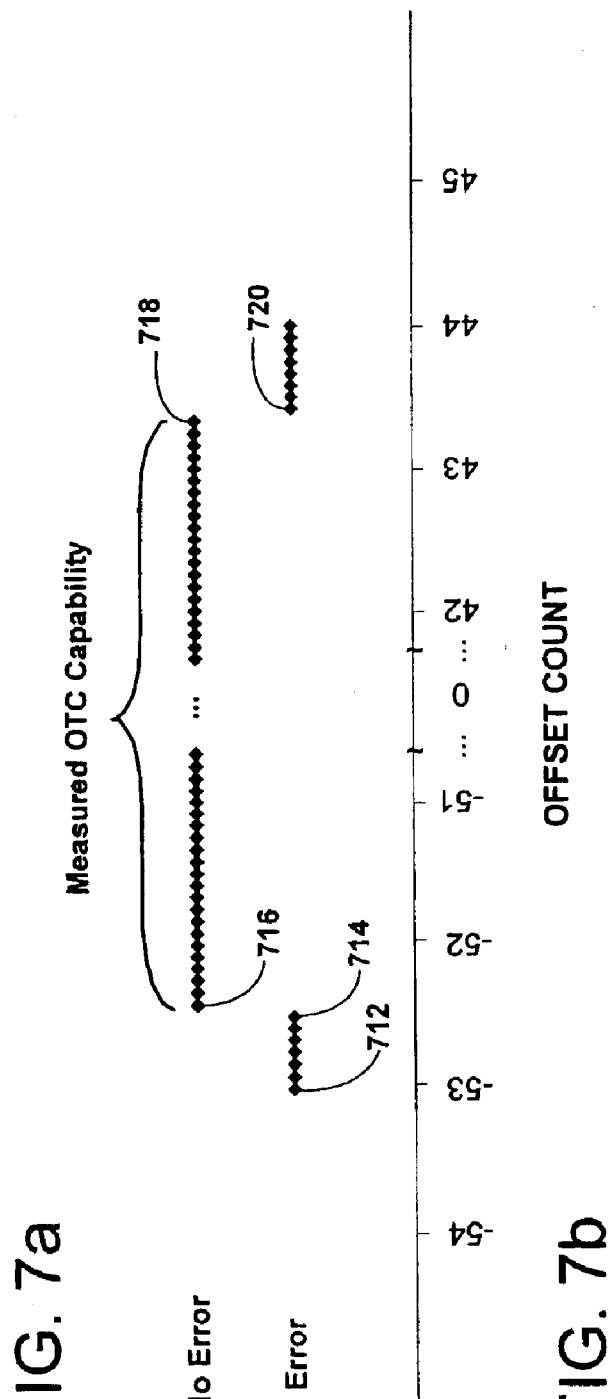
FIG. 7b shows a SME profile of a second iteration for measuring SME values in accordance with the present invention.

FIG. 7b shows a SME profile of a second iteration for measuring SME values in accordance with the present invention. The second iteration performs VGA readings across the tuning range that is defined according to the first iteration (e.g., from value 704 to value 710). The second iteration performs the VGA readings using a 1-step count-based MR offset, which causes the VGA readings of the second iteration to be more closely spaced than the VGA readings of the first iteration. The second iteration. VGA readings may use a second sync-mark tolerance that is more tolerant than the first sync-mark tolerance.

The figure shows example VGA readings made at during the second iteration. The VGA readings produce values 712−714, which indicate sync-mark errors. The next VGA reading produces value 716, which does not indicate an error. The VGA readings continue, which produces a last error-freed reading (value 718) and a succession of values with a sync-mark errors (beginning at value 720). Accordingly, the amount of finely spaced VGA readings (which require substantial amounts of time to complete and increased bit resolution) is minimized by restricting the finely spaced VGA readings to a region (or regions) of interest. The range defined by points 716 and 718 is the measured OTC. The midpoint of the range can be used as the MR offset, which can be stored in a RW offset table of a system sector of a disk.

Figure 8:
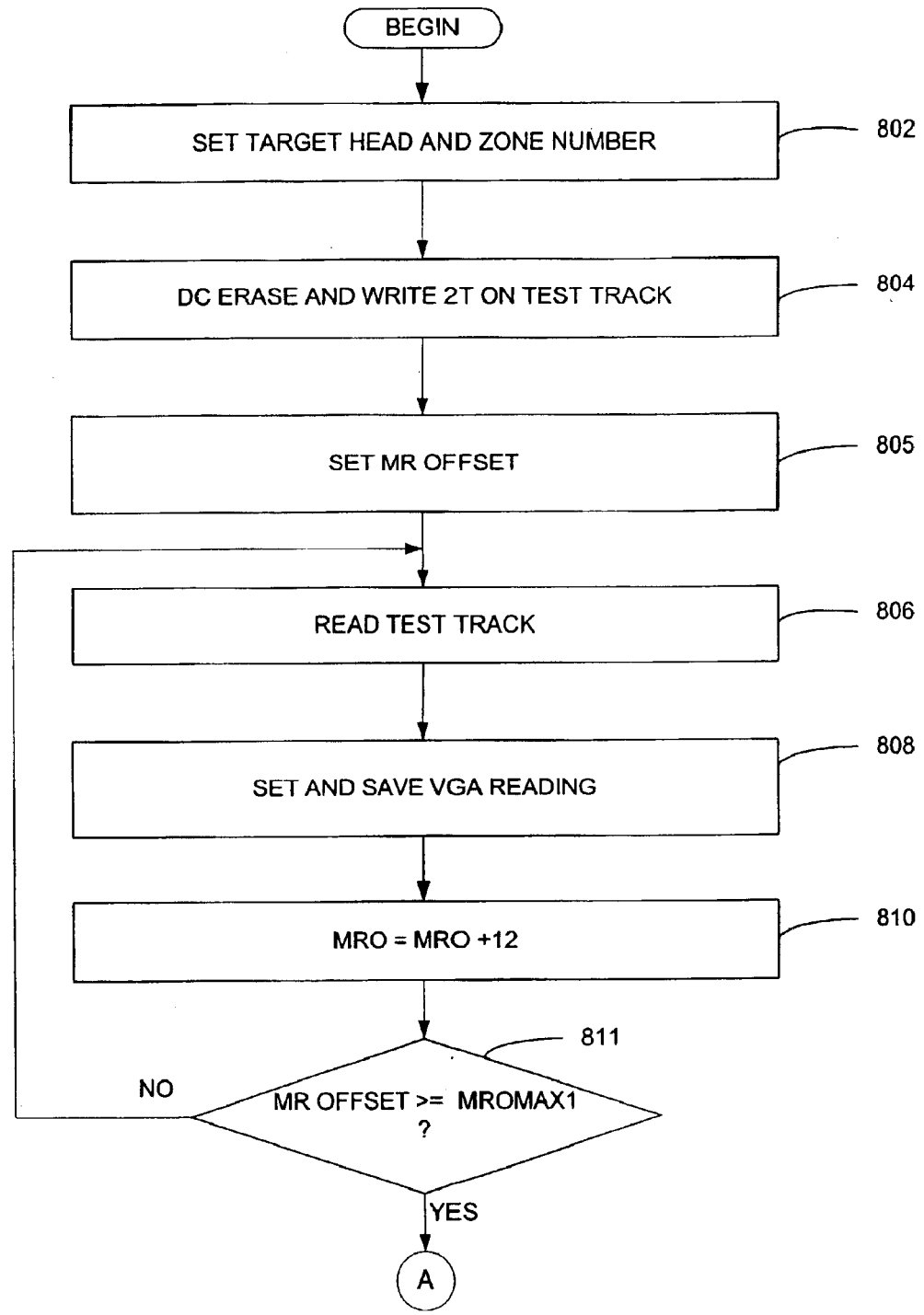
FIGS. 8–9 together comprise a flowchart illustrating operations for determining a reader-to-writer offset for a track in each zone on the disc in accordance with an embodiment of the present invention.
Figure 9:
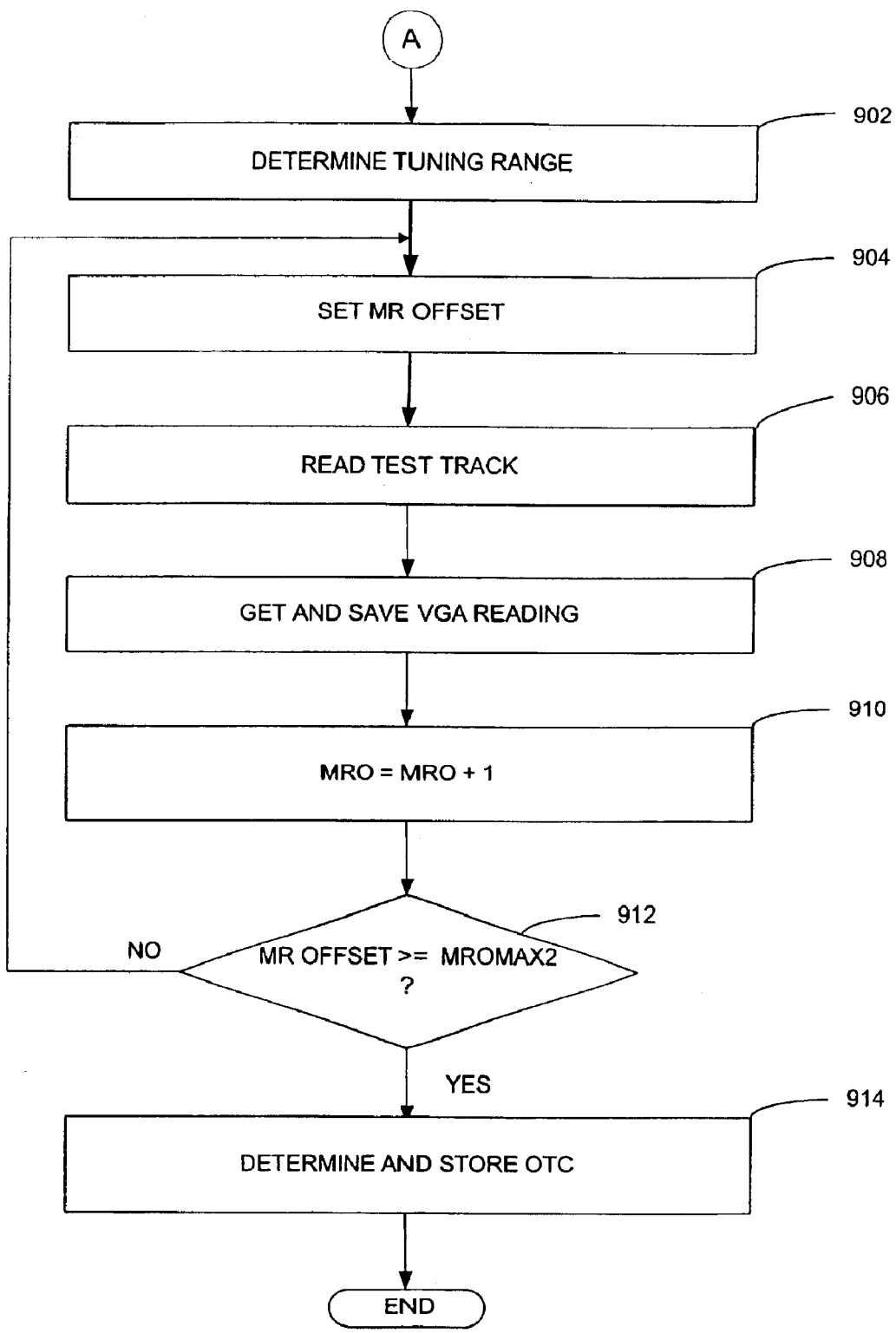

FIGS. 8–9 together comprise a flowchart for determining the optimal reader-to-writer offset for a track in each zone according to an embodiment of the present invention. Typically, thirteen zones are present on the disc, but the optimal reader-to-writer offset is determined on only the first track of each zone. The reader-to-writer offset values for other tracks in each zone are interpolated (as described above) by utilizing the optimal reader-to-writer offset values determined from the first tracks of the zones.

Now referring to FIG. 8, the technique for determining a reader-to-writer offset 410 begins in operation 802 by moving a selected head 118 over the first zone on the disc. Control then transfers to operation 804, in which operation the head 118 is moved over to the target track, which in this example is the first track in the zone. The writer 404 is moved over the center of the track, and the head position (x1) is then determined. Thereafter, any data written on the target track, a set of three tracks that is adjacent the target track toward the inner diameter of the disc, and another set of three tracks that is adjacent the target track toward the outer diameter of the disc (i.e., a total of seven tracks) is erased. The reason for erasing six additional tracks in addition to erasing the target track is that the length of the reader-to-writer offset may be more than a track pitch wide. (More densely arranged tracks may require more tracks to be erased.) After the seven tracks are erased, the head 118 is moved over the target track and the track is written with data that is typically a servo pattern (such as a 2T-type encoding). Operation 806 receives control and moves the head 118 a predetermined number of reader-to-writer offsets (e.g., about three reader-to-writer offsets) toward, the outer diameter of the disc away from the center of the target track.

Control transfers to operation 808. In this operation, the reader 402 reads the data to obtain a variable gain amplifier (VGA) value. Reading the data allows the reader 402 to collect sufficient information to compute the VGA value at this head position. If a VGA reading cannot be obtained within a predetermined number of disk revolutions, an error is returned. Operation 810 receives control whereupon the VGA value, if any, is computed and stored. In operation 812, the head 118 is "coarsely" adjusted by moving the head 12 offset counts towards the inner diameter of the disk. Control transfers to query operation 814, which examines whether the coarse maximum head offset count (MROMAX1) has been reached or exceeded. Operations 811–812 are repeated until the coarse maximum head offset count is reached or exceeded. If the count is reached or exceeded, the operation branches to 902 (now referring to FIG. 9) and determines the fine-tuning range. The fine-tuning range is determined by locating the point before the first valid VGA reading and by locating the point after the last valid VGA reading.

Operation 904 receives control and moves the head 118 a predetermined number of reader-to-writer offsets (e.g., about three reader-to-writer offsets) toward the outer diameter of the disc away from the center of the target track.

Control transfers to operation 906. In this operation, the reader 402 reads the data to obtain a variable gain amplifier (VGA) value. If a VGA reading cannot be obtained within a predetermined number of disk revolutions, an error is returned. Operation 908 receives control whereupon the VGA value, if any, is computed and stored. In operation 910, the head 118 is "finely" adjusted by moving the head only one offset count towards the inner diameter of the disk (other values that are smaller than the coarse adjustment may be used, although with less accuracy). Control transfers to query operation 912, which examines whether the fine maximum head offset count (MROMAX2) has been reached or exceeded. Operations 902–912 are repeated until the fine maximum head offset count is reached or exceeded. If the count is reached or exceeded, the operation branches to 914 and determines the OTC capability of head 118. The OTC capability is the range between the first valid VGA reading and by locating the last valid VGA reading. The midpoint (head position x2) of the range can be used as the reader-to-writer offset for the zone.

As described above, another test for valid readings (such as the BER method) may be used in operations 808, 810, 906, 908 and the result stored for later determination of the OTC boundaries.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method of generating a reader-to-writer offset for a head positioned over a track on a disc in a disc drive, wherein a reader and a writer are mounted on the head, the method comprising:

determining an inside coarse boundary and an outside coarse boundary of an off-track capability (OTC) of the head by using coarse steps for the reader across the track, wherein the OTC is a portion of a track pitch over which the reader is expected to read information written on the track that is free of an incorrigible bit error;

determining an inside fine boundary and an outside fine boundary of the OTC of the head by using fine steps for the reader within a range that is defined by the inside coarse boundary and the outside coarse boundary; and computing a difference between the inside fine boundary and the outside fine boundary to determine the reader-to-writer offset of the head.

2. The method according to claim 1, wherein the information written on the track is deemed to be free of an incorrigible bit error if a sync-mark error (SME) is not encountered during a plurality of disc revolutions during which a variable gain amplifier measurement is attempted.

3. The method according to claim 2, wherein the coarse boundaries are determined using a sync-mark tolerance that is stricter than a tolerance of used to determine the fine boundaries.

4. The method according to claim 1, wherein the information written on the track is free of an incorrigible bit error if a bit-error-rate (BER) computed after reading the information over a plurality of disc revolutions is less than a predetermined threshold BER value.

5. The method according to claim 1, wherein the fine boundaries are determined using a step size of one offset count.

6. The method according to claim 1, wherein computed difference is stored in a table in a system sector of the disk.

7. A computer-readable media readable by a computer and encoding instructions for executing the method recited in claim 1.

8. An apparatus for generating a reader-to-writer offset for a head positioned over a track on a disc in a disc drive having a plurality of tracks, wherein a reader and a writer are mounted on the head, the apparatus comprising:

a disc drive controller connected to the reader and the writer operable to determine the reader-to-writer offset of the head for each track by computing a difference between an inside fine boundary and an outside fine boundary, wherein the fine boundaries are determined by evaluating readings using fine steps for the reader within a range that is defined by an inside coarse boundary and an outside coarse boundary of an off-track capability (OTC) of the head, and wherein the coarse boundaries are determined by using coarse steps across the width of the track, and wherein the OTC is a portion of a track pitch over which the reader is expected to read information written on the track that is free of an incorrigible bit error.

9. The apparatus of claim 8, wherein the disc drive controller is further configured to evaluate readings by determining whether a sync-mark error (SME) is encountered during a plurality of disc revolutions during which a variable gain amplifier measurement is attempted.

10. The apparatus of claim 9, wherein the disc drive controller is further configured to determined the coarse boundaries by using a sync-mark tolerance that is stricter than a tolerance of used to determine the fine boundaries.

11. The apparatus of claim 8, wherein the information written on the track is free of an incorrigible bit error if a bit-error-rate (BER) determined after reading the information over a plurality of disc revolutions is less than a predetermined threshold BER value.

12. The apparatus of claim 8, wherein the disc drive controller is further configured to determine the fine boundaries by using a step size of one offset count.

13. The apparatus of claim 8, wherein the disc drive controller is further configured to store the computed difference in a table in a system sector of the disk.

14. An apparatus for generating a reader-to-writer offset for a head positioned over a track on a disc in a disc drive having a plurality of tracks, wherein a reader and a writer are mounted on the head, the apparatus comprising:

a disc drive controller operably connected to the reader and the writer; and means for computing a difference between an inside fine boundary and a outside fine boundary, wherein the fine boundaries are determined by evaluating readings using fine steps for the reader within a range that is defined by an inside coarse boundary and an outside coarse boundary of an off-track capability (OTC) of the head, and wherein the coarse boundaries are determined by using coarse steps across the width of the track, and wherein the OTC is a portion of a track pitch over which the reader is expected to read information written on the track that is free of an incorrigible bit error.

15. The apparatus of claim 14, wherein the disc drive controller is further configured to evaluate readings by determining whether a sync-mark error (SME) is encountered during a plurality of disc revolutions during which a variable gain amplifier measurement is attempted.

16. The apparatus of claim 15, wherein the means for computing is further configured to determine the coarse boundaries by using a sync-mark tolerance that is stricter than a tolerance of used to determine the fine boundaries.

17. The apparatus of claim 14, wherein the information written on the track is free of an incorrigible bit error if a bit-error-rate (BER) determined after reading the information over a plurality of disc revolutions is less than a predetermined threshold BER value.

18. The apparatus of claim 14, wherein the means for computing is further configured to determine the fine boundaries by using a step size of one offset count.

19. The apparatus of claim 18, wherein the means for computing is further configured to store the computed difference in a table in a system sector of the disk.

20. The apparatus of claim 14, wherein the means for computing is further configured to determine the fine boundaries by using a step size of one offset count.

* * * * *